US011063501B2

(12) United States Patent
Walter (10) Patent No.: US 11,063,501 B2
(45) Date of Patent: Jul. 13, 2021

(54) DEVICES AND METHODS FOR POSITIONING COPPER RODS FOR THE MANUFACTURE OF ELECTRICAL MACHINES

(71) Applicants: THYSSENKRUPP SYSTEM ENGINEERING GMBH, Heilbronn (DE); thyssenkrupp AG, Essen (DE)

(72) Inventor: Andreas Walter, Schwanewede (DE)

(73) Assignees: THYSSENKRUPP SYSTEM ENGINEERING GMBH, Heilbronn (DE); THYSSENKRUPP AG, Essen (DE)

( * ) Notice: Subject to any disclaimer, the term of this patent is extended or adjusted under 35 U.S.C. 154(b) by 208 days.

(21) Appl. No.: 16/069,116

(22) PCT Filed: Oct. 23, 2017

(86) PCT No.: PCT/EP2017/077024
§ 371 (c)(1),
(2) Date: Jul. 10, 2018

(87) PCT Pub. No.: WO2018/077812
PCT Pub. Date: May 3, 2018

(65) Prior Publication Data
US 2019/0006922 A1    Jan. 3, 2019

(30) Foreign Application Priority Data

Oct. 28, 2016   (DE) ..................... 10 2016 221 355.5

(51) Int. Cl.
*H02K 15/04* (2006.01)
*H02K 15/02* (2006.01)
(52) U.S. Cl.
CPC ......... *H02K 15/0428* (2013.01); *H02K 15/02* (2013.01)

(58) Field of Classification Search
CPC .......................... H02K 15/02; H02K 15/0428
See application file for complete search history.

(56) References Cited

U.S. PATENT DOCUMENTS 1,555,931 A   10/1925 Apple
1,661,344 A   3/1928 Poole
(Continued)

FOREIGN PATENT DOCUMENTS

CN   102986117 A   3/2013
DE   60102398 T    2/2005
(Continued)

OTHER PUBLICATIONS

English Translation of International Search Report issued in PCT/EP2017/077024, dated Jan. 15, 2018 (dated Jan. 23, 2018).

*Primary Examiner* — Minh N Trinh
(74) *Attorney, Agent, or Firm* — thyssenkrupp North America, LLC (57) ABSTRACT

A positioning device may be used to peripherally position copper rods about a center axis that defines an axial direction. Each of the copper rods may be generally U-shaped and may have a first leg portion and a second leg portion. The positioning device may include a positioning body, a rotary body, locking means, and a rotary drive. Grooves of an outer peripheral surface of the positioning body may receive the first leg portions of the copper rods, which can be locked in place by the locking means. The rotary body may be rotatable about the positioning body and may include guide channels that receive the second leg portions of the copper rods. The rotary drive can cause the rotary body and the positioning body to rotate relative to one another, to pivot the second leg portions inwardly into the grooves of the positioning body.

9 Claims, 10 Drawing Sheets

(56) References Cited

U.S. PATENT DOCUMENTS

| | | | | |
|---|---|---|---|---|
| 4,276,689 A | * | 7/1981 | Urick | H02K 15/068 29/596 |
| 4,285,119 A | * | 8/1981 | Habegger | H02K 15/068 29/596 |
| 5,363,546 A | | 11/1994 | Bradtmueller | |
| 5,454,156 A | * | 10/1995 | Morr | H02K 15/068 29/596 |
| 5,522,125 A | | 6/1996 | Bradtmueller | |
| 6,833,648 B2 | * | 12/2004 | Gorohata | H02K 3/12 310/180 |
| 8,215,000 B2 | * | 7/2012 | Guercioni | H02K 15/0056 29/596 |
| 8,561,447 B2 | * | 10/2013 | Guercioni | H02K 15/0428 72/299 |
| 8,726,493 B2 | | 5/2014 | Guercioni | |
| 2004/0074080 A1 | | 4/2004 | Kato | |
| 2005/0081365 A1 | | 4/2005 | Gorohata | |
| 2012/0326550 A1 | | 12/2012 | Kinpara | |
| 2014/0007415 A1 | | 1/2014 | Corbinelli | |
| 2014/0015366 A1 | | 1/2014 | Guercioni | |
| 2015/0022038 A1 | | 1/2015 | Guercioni | |
| 2016/0365777 A1 | | 12/2016 | Corbinelli | |
| 2019/0006922 A1 | * | 1/2019 | Walter | H02K 15/02 |

FOREIGN PATENT DOCUMENTS

| | | |
|---|---|---|
| DE | 43 01 234 B | 2/2013 |
| DE | 10 2012 012 119 A | 3/2013 |
| DE | 102014206105 A | 10/2015 |
| EP | 2684283 B | 1/2015 |
| JP | 2003 134751 A | 5/2003 |
| JP | 2004 072839 A | 3/2004 |
| JP | 2004 173357 A | 6/2004 |
| JP | 2005 065386 A | 3/2005 |
| JP | 2005 253294 A | 9/2005 |
| JP | 2013 165540 A | 8/2013 |
| WO | 2012014233 A | 2/2012 |
| WO | 2016005076 A | 1/2016 |

* cited by examiner

DEVICES AND METHODS FOR POSITIONING COPPER RODS FOR THE MANUFACTURE OF ELECTRICAL MACHINES

CROSS REFERENCE TO RELATED APPLICATIONS

This application is a U.S. National Stage Entry of International Patent Application Serial Number PCT/EP2017/077024, filed Oct. 23, 2017, which claims priority to German Patent Application No. DE 10 2016 221 355.5, filed Oct. 28, 2016, the entire contents of both of which are incorporated herein by reference.

FIELD

The present disclosure generally relates to positioning devices and methods for the peripheral positioning of copper rods about a center axis.

BACKGROUND

In the manufacture of electrical machines, for instance electric motors or generators, it is a question of simplifying the assembly process and, at the same time, improving the quality parameters during the assembly process. A distinction should herein be drawn between stator elements or rotor elements produced in winding technology or in hairpin technology. Hairpin technology offers the possibility of increasing the power density of electric motors which are intended for use in motor vehicles. In hairpin technology, specially bent copper rods, which because of their shape are referred to as hairpins, are inserted into axially running receiving grooves of the stator element or rotor element, which are arranged on the inner periphery or outer periphery. In this context, WO 2012/014233 A1 and WO 2016/005076 A1 can be cited as documents relating to the prior art.

In the course of the following description, the term copper rod is used and the term hairpin is abandoned. A copper rod within the meaning of this description is preferably bent in a U-shape, so that it has two substantially parallel leg portions, which are connected to each other by a transverse portion. The length of this transverse portion determines the so-called span of the copper rod, which span hence defines the distance apart of the two leg portions. In the mounted state of the copper rods, the two leg portions are inserted in the receiving grooves of the stator element or rotor element. The described bending or shape of the copper rod requires that, viewed in an axial view, the two leg portions are seated parallel to the center axis M in the receiving grooves, yet on different diameters related to the center axis M. Because the two leg portions of a copper rod lie on different diameters, an overlap of copper rods inserted adjacently in the stator element or rotor element ensues. In order to be able to realize wiring diagrams which are different for the electrical machine which is to be produced, copper rods having different spans, or copper rods having uniform spans, are used. It is in principle important, however, that the spans amount to a multiple of the peripheral distances—related to the center axis M—of the stator element or rotor element—between the receiving grooves.

In recent times, efforts have increasingly been made to develop hairpin technology from a predominantly manual or semiautomatic production to an, as far as possible, automated production. These assembly methods are very time consuming. Due to the high requirements placed on the positional accuracy of the components in association with low component tolerances, a manual or semiautomatic production leads to high cycle times and, in all likelihood, to damage to the components, resulting in a high reject rate. The manufacture of rotor elements in hairpin technology has already been known for some time, as is described, for instance, by U.S. Pat. No. 1,555,931. In addition, in U.S. Pat. No. 1,661,344 an assembly device for producing rotor elements in hairpin technology is described, wherein at most a semiautomatic assembly can herewith be performed. From a structural viewpoint, the assembly process can be divided into:

1. a prepositioning, in which it is firstly important to arrange the individual copper rods peripherally, both relative to one another and in total,
2. an assembly preparation by means of an assembly device, to which the copper rods are delivered in the prepositioned arrangement, and
3. the actual assembly operation, in which the copper rods are inserted by means of the assembly device into the stator element or rotor element to be loaded.

Since, in the assembly operation, a short cycle time ensues when as many copper rods as possible are simultaneously inserted into the corresponding receiving grooves of the stator element or rotor element, it would be desirable, already in the prepositioning, to ensure a simplest possible handling of the copper rods. A device which is used for this must hence enable a simple and damage-free arrangement of the copper rods, thus also take account of the fact that adjacent copper rods, in their prepositioned and also mounted arrangement, can mutually overlap. In addition, copper rods of different span must be able to be installed. Furthermore, a positioning device must be suitable both for a manual and for an automated loading with copper rods.

Thus a need exists for devices and methods that aid the first step of prepositioning within the entire assembly process and take account of the requirements outlined above.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a positioning device for the peripheral positioning of a plurality of copper rods about a center axis M which describes an axial direction, wherein the copper rods are of substantially U-shaped configuration, having a first leg portion and a second leg portion.

In some examples, a positioning device may be used for the peripheral positioning of a plurality of copper rods about a center axis M which describes an axial direction, wherein the copper rods are of substantially U-shaped configuration, having a first leg portion and a second leg portion. The positioning device may comprise a positioning body, which is arranged with an outer peripheral surface concentrically about the center axis M, a rotary body, which is arranged such that it is rotatable coaxially about the positioning body, wherein the positioning body forms on the outer peripheral surface axially running receiving grooves for respectively receiving one of the leg portions of a copper rod, and the rotary body forms guide channels, which are open inwardly in the direction of the center axis A, for receiving the other leg portion of the respective copper rod, wherein locking means are provided, in order to hold the leg portion of the copper rod, pivotably about a pivot axis S parallel to the center axis M, in the respective receiving groove of the positioning body, and wherein a rotary drive mechanism for imparting a rotation to the rotary body relative to the positioning body is provided, in order to pivot, by rotation of the rotary body, the leg portions accommodated in the guide channels of the rotary body inwardly in the direction of the center axis M into the receiving grooves of the positioning body.

According to the invention, it is provided that the positioning device can move the copper rods between a loading position and an assembly-ready removal position, wherein this movement advantageously consists in a pivot motion. In addition, this pivot motion is advantageously realized about the leg portions held in the receiving groove of the positioning body. This means that the copper rods do not overlap prior to execution of the pivot motion, so that the positioning device can be loaded with the copper rods, predominantly in the axial direction, without the copper rods impeding one another or colliding with one another. Through the pivot motion, which according to the invention is initiated by the rotary drive mechanism, all copper rods are prepositioned at the same time, so that, on this basis, they can be fed, for instance, to an, in the assembly process, following assembly device. In this context, it does no harm for at least adjacent copper rods to overlap. According to the invention, it is provided that the positioning device is movable between a basic setting, in which the positioning device is loaded with the copper rods, and an end setting, in which the positioning device holds the copper rods in the described partially overlapping and substantially peripheral arrangement.

One advantageous embodiment of the invention provides that the guide channels are closed to an axial side of the rotary body. This means that the copper rods, toward this axial side of the guide channels, can assume a defined position during the loading of the positioning device.

One advantageous embodiment of the invention provides that the rotary body comprises a mounting disk and a rotary drive disk, wherein the guide channels are configured in the mounting disk. As a result, the possibility of a simple production of the guide channels in the mounting disk is offered. In particular, it can be provided that the mounting disk and the rotary drive disk are arranged concentrically and axially adjacent to each other. It is hereby advantageously possible to use that end face of the rotary drive disk which is facing toward the mounting disk as a boundary of the guide channels. Thus one specific embodiment of the invention can provide that an axial end face, facing toward the mounting disk, of the rotary drive disk forms an axial contact surface for the leg portions, accommodated in the guide channels of the mounting disk, of the copper rods.

One advantageous embodiment of the invention provides that the rotary body is held rotatably, by means of the rotary drive disk, on a main body of the prepositioning device. As a result, over the main body is provided a fixed component, by which the entire positioning device, where necessary, can be transported, or combined with other similar positioning devices to form an assemblage.

One advantageous embodiment of the invention provides that the locking means comprise a locking cage having axially directed stop bars, which locking cage is mounted rotatably in relation to the main body and the rotary drive disk. Via a rotatably mounted locking cage, it is advantageously possible to switch easily and quickly between a locked setting and an unlocked setting.

One advantageous embodiment of the invention provides that the locking cage comprises a number of stop bars which corresponds to the number of receiving grooves of the positioning body. It is hereby possible to lock or free each individual receiving groove.

One advantageous embodiment of the invention provides that the stop bars are arranged projecting in the axial direction between the positioning body and the mounting disk. All in all, a compact and functionally integrated arrangement is hereby achieved.

In addition, the object is achieved by a method for the peripheral positioning of a plurality of copper rods, using the described positioning device, and comprising the steps:

loading of the positioning body and the rotary body with copper rods;

locking of the respective leg portions, accommodated in the receiving grooves of the positioning body, of the copper rods by means of the locking means;

rotation of the positioning body and/or the rotary body relative to each other by means of the rotary drive mechanism, and transferal of the leg portions, accommodated in the guide channels, of the copper rods out of the guide channels of the rotary body into the receiving grooves of the positioning body.

One advantageous embodiment of the method provides an unlocking of the receiving grooves, locked by the locking means, of the positioning body in the course of the transferal of the leg portions from the guide channels into the receiving grooves.

One advantageous embodiment of the methods provides a removal of the copper rods positioned in the receiving grooves of the positioning body, following complete transferal of the respective leg portions from the guide channels into the receiving grooves.

Figure 1:
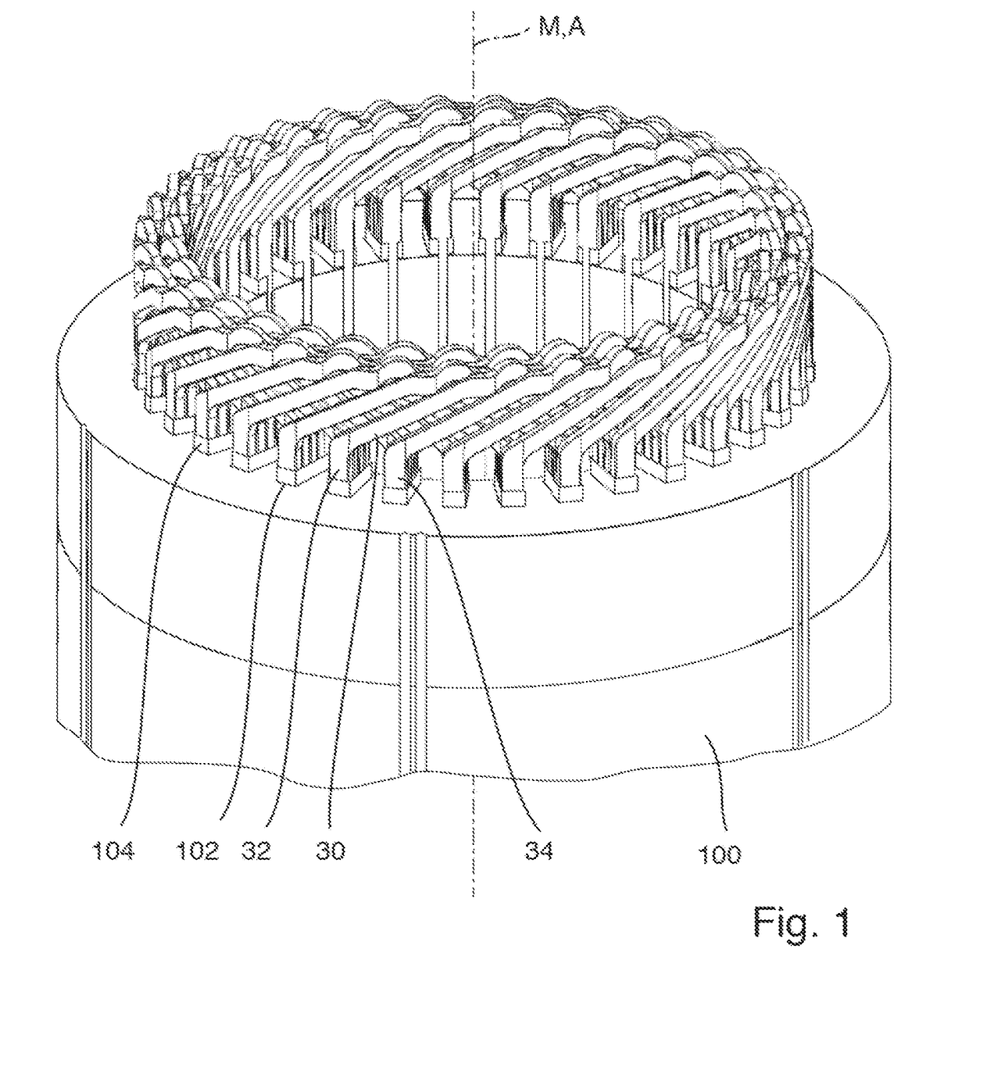
FIG. 1 is a perspective view of an example stator element having a plurality of loaded copper rods.

FIG. 1 firstly shows, by way of example, a stator element 100 for an electrical machine, for instance in the form of an electric motor. This stator element 100 has already undergone the previously described assembly process, which has been outlined, by way of example, with the structural breakdown: prepositioning, assembly preparation and assembly operation. Consequently, a plurality of copper rods 30 is inserted in peripherally arranged receiving grooves 102 of the stator element 100. It can now be seen that, in the present case, four copper rods 30 are inserted, with respectively one of their leg portions 32, 34, in a receiving groove 102. In each receiving groove 30, the leg portions 32, 34 are arranged side by side in the radial direction. Starting from the leg portions 32, 34 of a receiving groove 102, the other leg portions 34, 32 of each copper rod 30 are inserted alternately in opposite peripheral direction in corresponding receiving grooves 102. A radial offset between the inserted leg portions 32, 34 of a copper rod 30 can further be seen, wherein this radial offset leads to the already described overlaps of adjacent copper rods 30. Furthermore, the leg portions 32, 34 which are inserted in a receiving groove 102 are jointly surrounded by an insulation 104.

Figure 2:
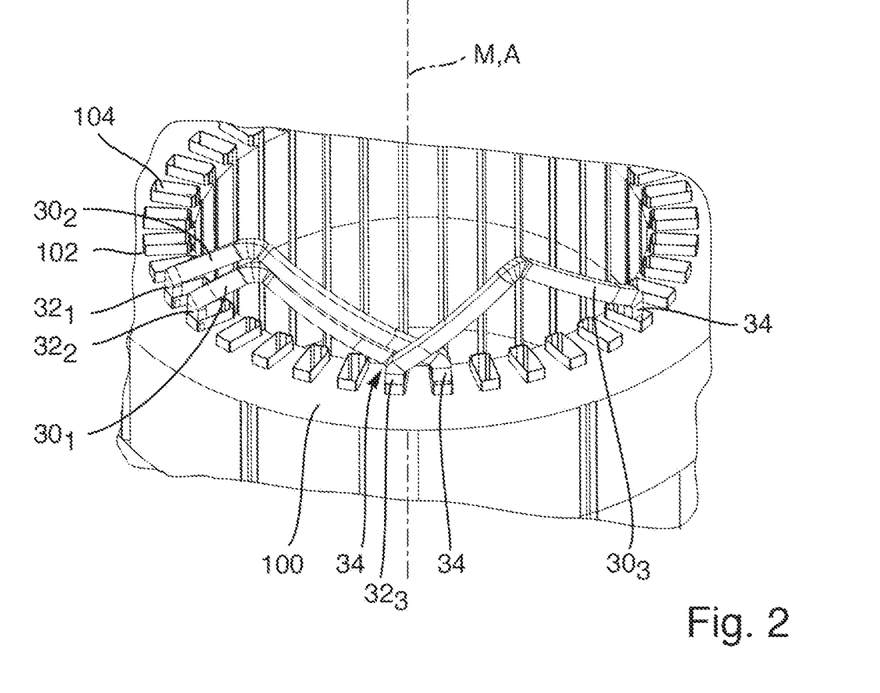
FIG. 2 is a partial perspective view of the example stator element of FIG. 1.

FIG. 2 shows a further representation of a stator element 100, having in the present case only three inserted copper rods $30_1$, $30_2$, $30_3$. It can be seen that the respectively left-hand leg portion $32_1$, $32_2$, $32_3$ is inserted in the radially outermost position of the respective receiving groove 102. By contrast, the corresponding right-hand leg portion $34_1$, $34_2$, $34_3$ is inserted in the radially next inner position of the respective receiving groove 102. An overlap of the two left-hand copper rods $32_1$ and $32_2$ is hence clearly discernible. From this it is thus made clear that an insertion, for instance, of these two copper rods $32_1$ and $32_2$, insofar as this then is intended to be realized directly in a peripheral alignment of the copper rods, must be realized successively and cannot take place simultaneously. From FIG. 2, the span of a copper rod 30, which namely is the distance running in the peripheral direction—related to the center axis A—between the respective leg portions 32, 34 of each copper rod 30, can also be illustrated.

Figure 3:
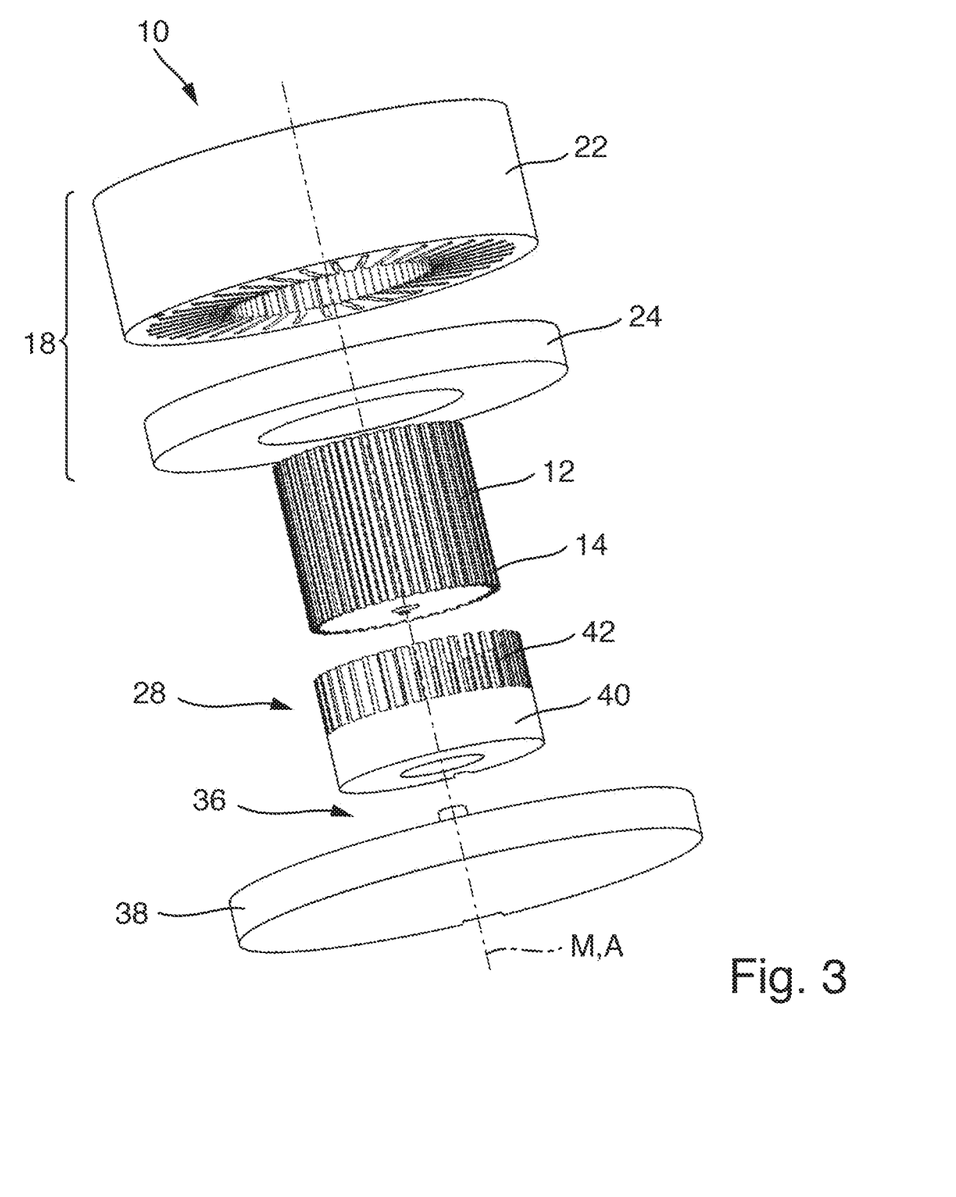
FIG. 3 is an exploded view of an example positioning device.

FIG. 3 now shows a positioning device 10 according to the invention in an exploded representation. In principle, the positioning device 10 comprises a main body 38, a positioning body 12, locking means 28 and a rotary body 18, wherein these components are of circular configuration and are arranged coaxially to the center axis M. In the present case, it is provided that the rotary body 18 comprises a mounting disk 22 and a rotary drive disk 24, which are both likewise arranged coaxially to the center axis M. As is shown later on the basis of a non-exploded sectional representation, the positioning body 12 and the locking means 28 are arranged within the rotary body 18, wherein the locking means 28 comprise a locking cage 40 having axially directed and peripherally arranged stop bars 42, and the locking cage 40, at least partially, and the stop bars, preferably fully, are seated in a peripheral space between the positioning body 12 and the rotary body 18.

The degrees of freedom of these components of the positioning device 10 are now such that the mounting disk 22 is connected in a rotationally secure manner to the rotary drive disk 24, and both are together mounted rotatably, by means of the rotary drive disk 24, on the main body 38. The positioning body 12 is held in a rotationally secure manner on the main body 38, so that, due to the rotatability of the mounting disk 22 in conjunction with the rotary drive disk 24, a relative rotation between these and the positioning body 12 is possible. The locking means 28 are held rotatably in relation to the main body 38, so that the locking means 28 are rotatable in relation to the positioning body 12. By virtue of this rotatability, the locking means 28 are movable between a locking setting and an unlocking setting, as is described later in greater detail.

Figure 4:
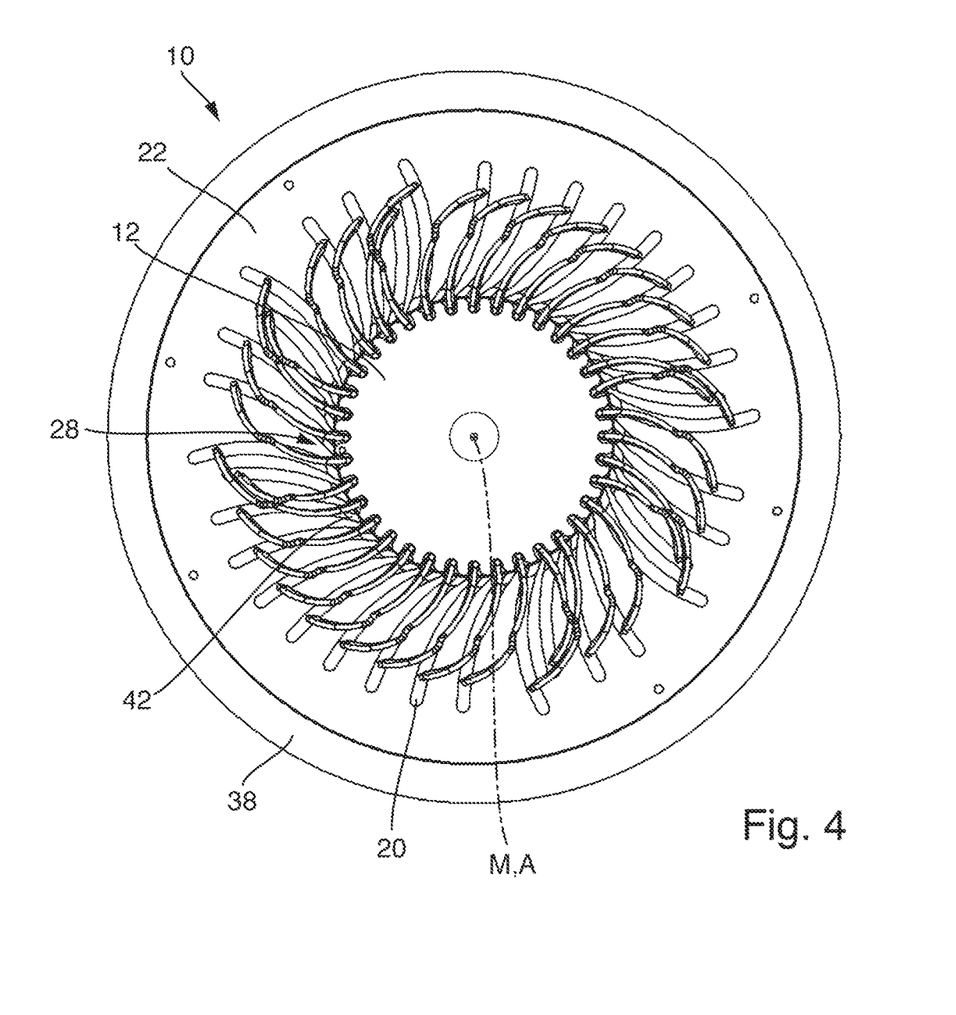
FIG. 4 is a top view of the example positioning device of FIG. 3.

With additional reference to FIG. 4, on the one hand the outer peripheral surface 14 of the positioning body 12, and on the other hand the inside of the mounting disk 22, are set to be described in terms of their respective characteristics. FIG. 4 shows a top view in the axial direction through an assembly of a positioning device 10. Viewed from the outside inward, the main body 38 and the mounting disk 22, the locking means 28 and the positioning body 12 are represented. It can be seen that the mounting disk 22 has guide channels 20, which are open peripherally from radially outside to inside in the direction of the center axis A. Where necessary, these guide channels 20 can have a different or same radial length, or run in an arc shape or crescent shape in the direction of the center axis A. In any event, the guide channels 20 are open inwardly in the direction of the center axis A. Preferably, the guide channels 20 run in an axial direction—i.e. perpendicularly to the plane of the drawing—fully through the mounting disk 22 with constant peripheral width. With the aid of the representation of FIG. 3, it can now be seen, however, that the guide channels 20 in the axial direction, toward the main body 38, are covered or closed off by the rotary drive disk 24. To the other side, the guide channels 20 remain open in order to be able to load them with copper rods 30.

In a functional respect which is yet to be described, the positioning body 12 forms on an outer peripheral surface 14 receiving grooves 16 which correspond to the guide channels 20 of the mounting disk and run in the axial direction. Preferably, the number of guide channels 20 corresponds to the number of receiving grooves 16. In the peripheral space between the mounting disk 22 and the positioning body 12 are seated the locking means 28, wherein, in the view of FIG. 4, in particular the stop bars 42 can be seen.

Figure 5:
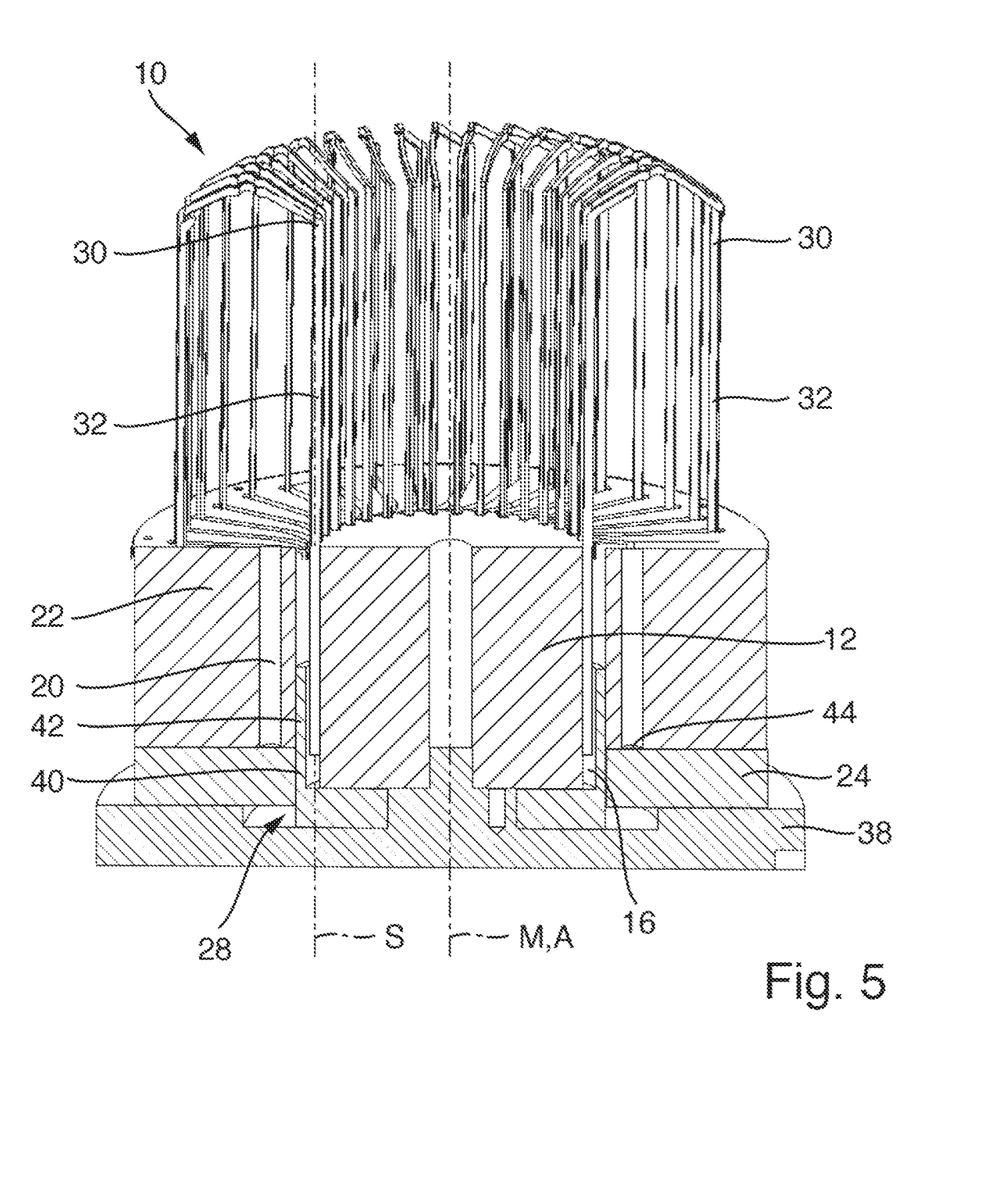
FIG. 5 is a cross-sectional view of the example positioning device of FIG. 3.

FIG. 5 shows a cross section along the center axis M through an assembly of a positioning device 10. It is evident that the stop bars 42 of the locking means 28 are in the locking setting with respect to the receiving grooves 16 of the positioning body 12, in that namely the stop bars 42 cover over or lock the receiving grooves 16. By this locking of the receiving grooves 16 of the positioning body 12, it is ensured that the respective leg portion 32 of the copper rod 30 with which the positioning device 10 is loaded is held in the receiving groove 16 rotatably about a pivot axis S, but otherwise radially captively. FIGS. 3 and 5 reveal that the receiving grooves 16 of the positioning body 12 can extend over the entire axial height of the positioning body 12. In comparison hereto, the guide channels 28 of the assembly body 22 have a lower axial height than the receiving grooves 16, wherein the guide channels 28, over their radial path in the direction of the main body 38, are closed off by the rotary drive disk 38 and at least a part of the axial height of the rotary drive disk 38 likewise encloses the receiving grooves 16.

Figure 6:
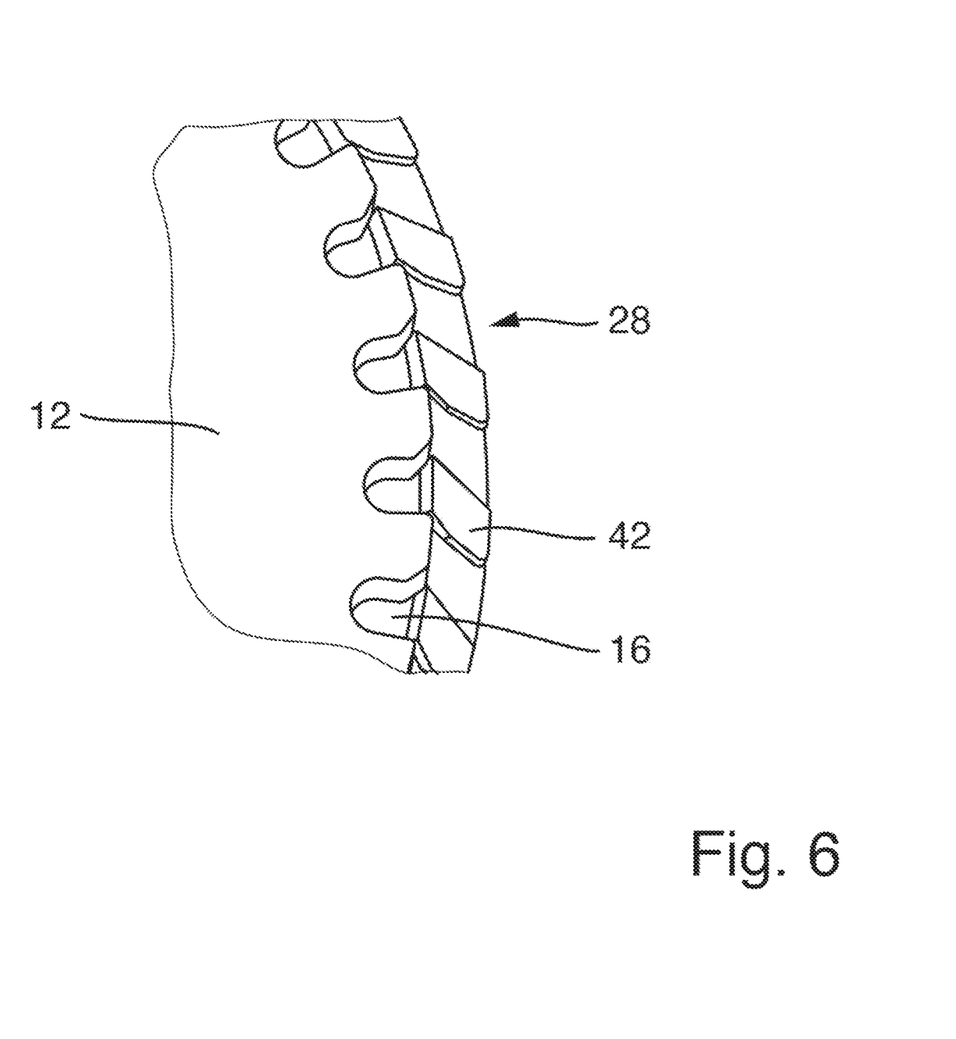
FIG. 6 is a detail view of the example positioning device of FIG. 3.

FIG. 6 shows a detail for illustration of the locking of the receiving grooves 16. An axial section shows the positioning body 12 with the receiving grooves 16, and the locking means 28 with the peripherally arranged stop bars 42. The stop bars 42 are in the locking setting, so that they lie in front of the receiving grooves 16 and lock these. If the stop bars 42 are turned into the unlocking setting, they free the receiving grooves and lie in front of the webs between the receiving grooves 16.

Figure 7A:
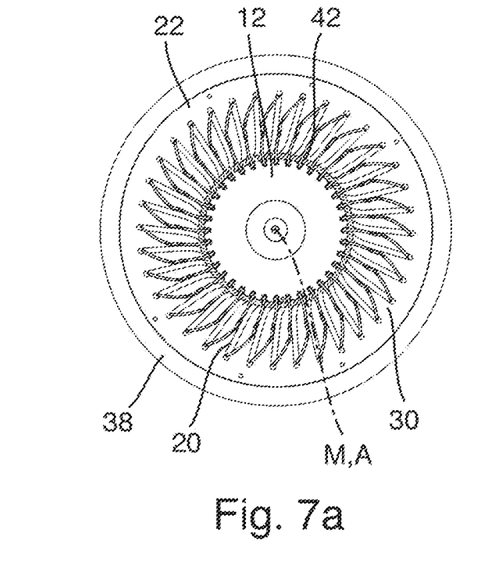
FIG. 7*a* is a top view depicting a first sequence of an example method for positioning copper rods with the aid of the positioning device according to FIG. 3.
Figure 7B:
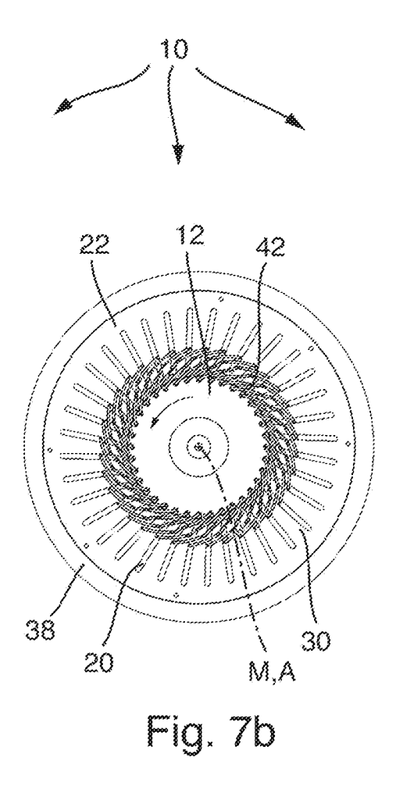
FIG. 7*b* is a top view depicting a second sequence of an example method for positioning copper rods with the aid of the positioning device according to FIG. 3.
Figure 7C:
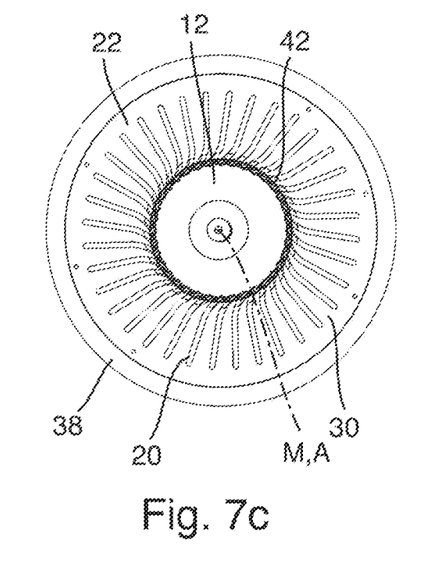
FIG. 7*c* is a top view depicting a third sequence of an example method for positioning copper rods with the aid of the positioning device according to FIG. 3.

The sequence a) to c) of FIG. 7 shows a method for the peripheral positioning of a plurality of copper rod 30, using a positioning device 10 according to the invention. The representation of FIG. 7a) is preceded by a loading of the positioning device 10 with copper rods 30 from axially above, to be precise by manual means or with a suitable handling tool. The copper rods 30 have in the present case an equal span. Each copper rod 30 is inserted with one leg portion 32, in the present case the inner of the two leg portions 32, 34, in a receiving groove 16 of the positioning body 12, and with the other leg portion 34, in the present case the outer of the two leg portions 34, 32, in a guide channel 20 of the mounting disk 22. The receiving grooves 16 are locked by means of the locking means 28, as has been described in connection with FIG. 6. Each copper rod 20 is inserted in the receiving groove 16 or the guide channel 20 to the point where the outer leg portion 34 comes into contact with and comes to bear against a contact surface 44 of the rotary drive disk 24. The axial position of the copper rods 30 with respect to the positioning device 10 in the initial state of the method is hence determined by the bearing contact of the outer leg portions 34 on the contact surface 44 of the rotary drive disk 24. The top view of FIG. 7a) further reveals that all copper rods 30 are inserted, without mutual overlap, in the positioning device 10. In this method stage, the copper rods 30 are arranged substantially radially with respect to the center axis M.

A positioning of the copper rods 30 into a peripheral arrangement with respect to the center axis M is initiated by the instigation of a relative rotation between the positioning body 12 and the mounting disk 22. It can herein be provided, for instance, that the positioning body 12 is rotated counterclockwise with respect to the mounting disk 22. Alternatively, it is possible for the mounting disk 22 to be rotated clockwise with respect to the positioning body 12. Finally, it is also conceivable that both the positioning body 12 and the mounting disk 22 are rotated in the rotational directions which have just been specified. In any event, it is provided that, during the positioning phase, the locking cage 40 with the stop bars 42 performs no relative rotation with respect to the positioning body 12, in order to maintain the locking of the inner leg portions 32. Since the inner leg portions 32 are held captively but pivotably in the receiving grooves 16 of the positioning body 12 and the outer leg portions 34 are movable along the guide channels 20, the outer leg portions 34 are guided by the guide channels 20 such that they slide inward in the guide channels 20 and hereupon, via the connecting web, pivot the inner leg portion 32 in the receiving grooves 16. By rotation of the positioning body 12 in relation to the mounting disk 22, the outer leg portion 34 is consequently moved closer to the positioning body 12 and the receiving grooves 16 without the inner leg portions 34 changing their, in the receiving grooves 16, pivotable and captive position.

An intermediate setting is shown by FIG. 7b), in which the outer leg portions 34 have already been moved somewhat in the direction of the positioning body 12 by rotation of this same.

An end setting is shown by FIG. 7c), in which the outer leg portions 34 have likewise been transferred fully into the receiving grooves 16 of the positioning body 12. For this, shortly before the outer leg portions 34 leave the guide channels 20, the locking means 28 have been turned from the locking setting into the unlocking setting, so that the receiving grooves 16 are freed in order to be able to receive the outer leg portions 34.

Figure 8A:
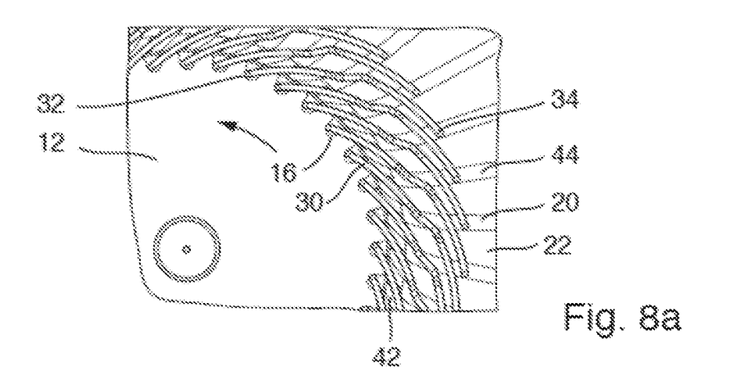
FIG. 8*a* is a detail view corresponding to the first sequence of the example method of FIG. 7*a*.
Figure 8B:
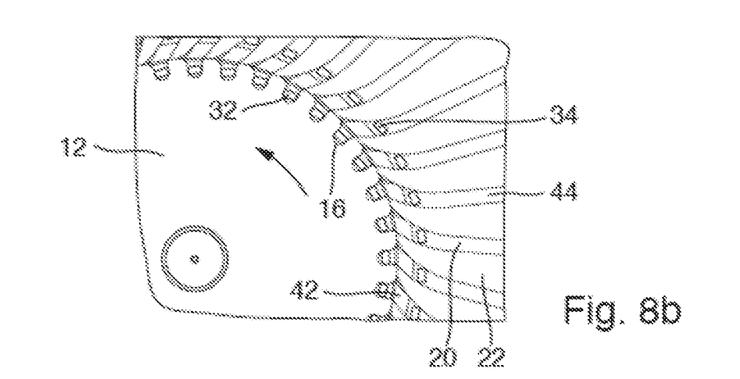
FIG. 8*b* is a detail view corresponding to the second sequence of the example method of FIG. 7*b*.
Figure 8C:
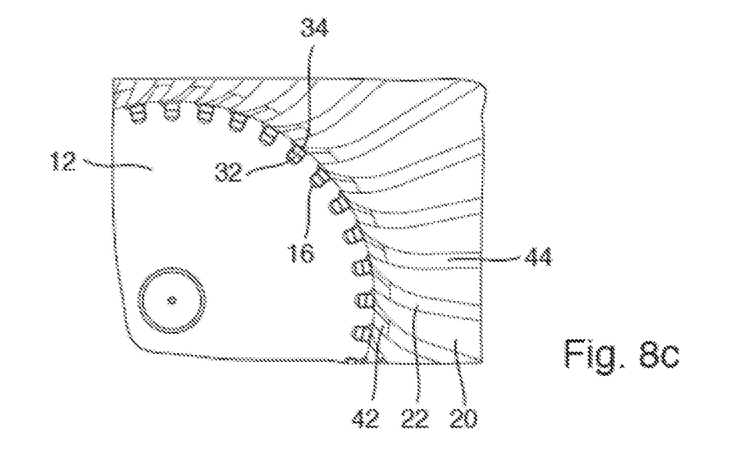
FIG. 8*c* is a detail view corresponding to the third sequence of the example method of FIG. 7*c*.

FIGS. 8a) to 8c) show details of the method described with reference to FIGS. 7a) to 7c). FIG. 8a) shows the state referred to as the intermediate setting. The locking means 28 are still in the locking setting, so that the inner leg portions 32 are pivotable, but are captive within the receiving grooves 16. FIG. 8b) shows a state shortly before the outer leg portions 34 leave the guide channel 20 and are transferred into the receiving grooves 16. In this state, the locking means 28 are transferred into the unlocking setting in order to free the receiving grooves 16 for the reception of the outer leg portions 34. Starting from the state shown in FIG. 8b), a further rotation of the positioning body 12 is made, so that finally the end setting shown in FIG. 8c), in which the copper rods 30 are accommodated with their two leg portions 32, 34 in the receiving grooves 16, is reached. In the passage from the intermediate setting into the end setting, the outer leg portions 34 slide off from the contact surface 44 on the rotary drive disk 24, so that the copper rods 30 slide with both leg portions 32, 34 in the axial direction further into the positioning device and, in the receiving grooves 16, assume their respective end setting both in the axial and in the radial direction. It is crucial that in the end setting in each receiving groove 16 an inner leg portion 32 and an outer leg portion 34 of two different copper rods 30 are accommodated. Finally, the copper rods positioned in their end setting are removed as a unit from the positioning device 10, for instance by a suitable grab device, and are fed to the next step in the assembly process.

Figure 9A:
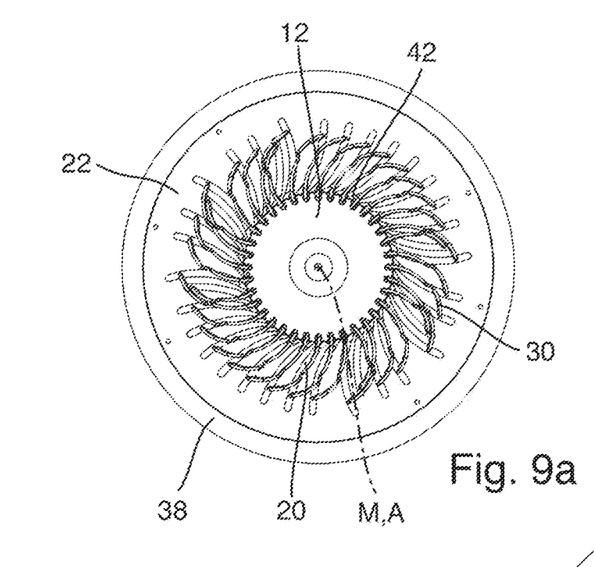
FIG. 9*a* is a top view of an example positioning device in a first sequence of an example method.
Figure 9B:
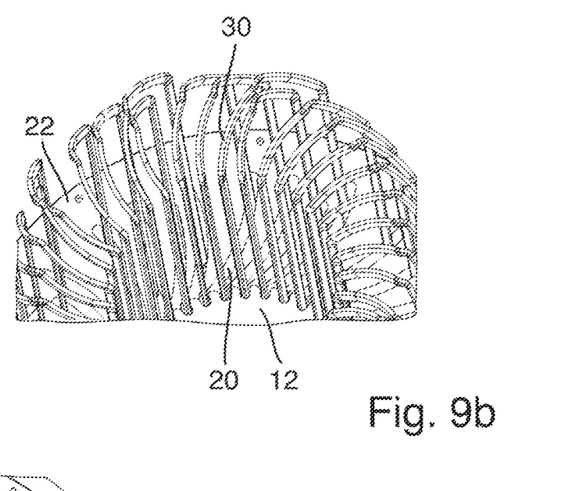
FIG. 9*b* is a perspective view of an example positioning device in a second sequence of an example method.
Figure 9C:
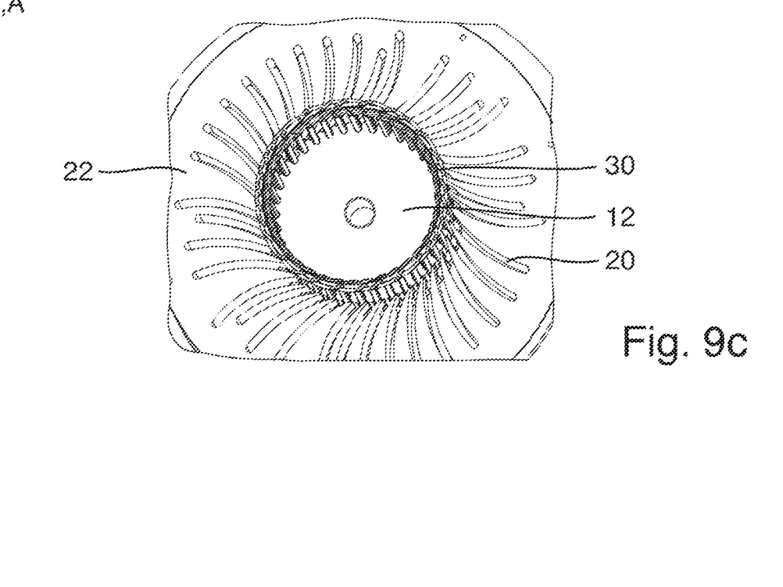
FIG. 9*c* is a perspective view of an example positioning device in a third sequence of an example method.

Finally, FIG. 9 shows a positioning device 10 for positioning copper rods 30 with different span. It can be seen that the guide channels 20 are configured in the mounting disk 22 with an adapted length and at an adapted angle.

Figure 10:
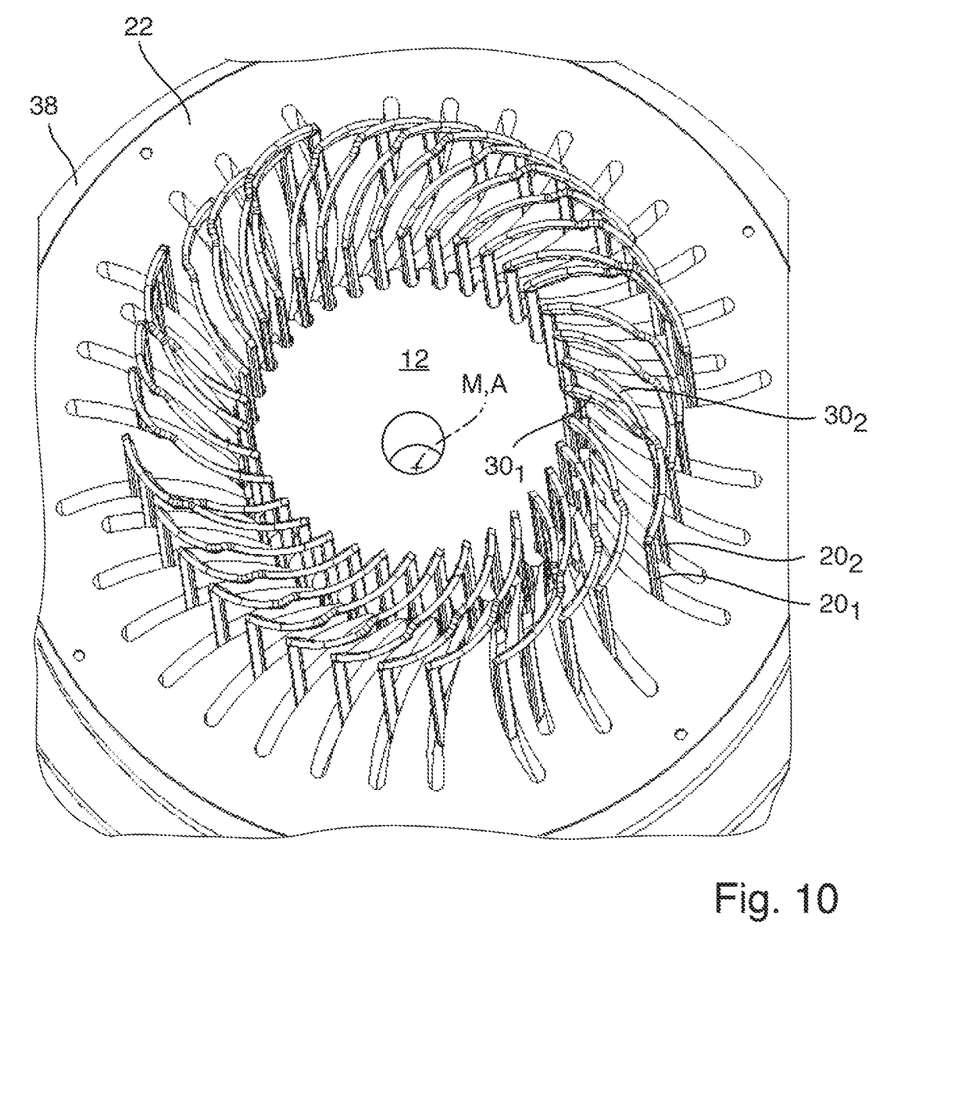
FIG. 10 is a detail view of an example positioning device for use with the method represented according to FIG. 7 and FIG. 9.

With reference to FIG. 10, it is once again represented that, during the rotary motion of the positioning device 10 from the initial state—compare FIG. 7a)—into the end setting—compare FIG. 7c)—an overlap of adjacent copper rods 30 progressively ensues. If, for instance, the guide channels $20_1$ and $20_2$ and the corresponding copper rods $30_1$ and $30_2$ accommodated therein are viewed in the axial direction A, then it can be seen that, in respect of these copper rods $30_1$ and $30_2$, an overlap has already occurred. Upon further rotation into the end setting, an increasing number of adjacent copper rods 30 overlap. With the positioning device 10 according to the invention, it is thus possible to load the device in the initial state with all copper rods 30, as far as possible simultaneously, in a fanned or radially directed setting, and subsequently, by the rotary motion, to transfer the copper rods 30 into the end setting, in which at least adjacent copper rods 30, viewed in the axial direction A, overlap. With the positioning device 10 according to the invention, the need to pull copper rods already inserted in the end setting at least a certain way back out in order to insert an adjacent, in the end setting overlapping, further copper rod, as is provided by traditional assembly processes, can hence be avoided.

REFERENCE SYMBOL LIST 10 positioning device
12 positioning body
14 outer peripheral surface
16 receiving groove
18 rotary body
20 guide channel
22 mounting disk
24 rotary drive disk
26 contact surface
28 locking means
30 copper rod
32 leg portion
34 leg portion
36 rotary drive mechanism
38 main body
40 locking cage
42 stop bar
44 contact surface
100 stator element
102 receiving groove
104 insulation
M center axis
A axial direction
S pivot axis

What is claimed is:

1. A positioning device for peripheral positioning of copper rods about a center axis that defines an axial direction, the positioning device comprising:
   a positioning body with an outer peripheral surface that is disposed concentrically about the center axis, the outer peripheral surface forming axially-running receiving grooves for receiving, respectively, first leg portions of the copper rods;
   a rotary body that is rotatable coaxially about the positioning body, the rotary body forming guide channels that are open inwardly in a direction of the center axis, the guide channels for receiving, respectively, second leg portions of the copper rods, wherein the rotary body comprises a mounting disk and a rotary drive disk, wherein the guide channels are configured in the mounting disk of the rotary body;
   locking means for holding each first leg portion in each axially-running receiving groove pivotably about a pivot axis parallel to the center axis; and
   a rotary drive mechanism that imparts a rotation to the rotary body relative to the positioning body, in order to pivot the second leg portions in the guide channels inwardly in the direction of the center axis into the axially-running receiving grooves of the positioning body.

2. The positioning device of claim 1 wherein the guide channels are closed to an axial side of the rotary body.

3. The positioning device of claim 1 wherein the mounting disk and the rotary drive disk are disposed concentrically and axially adjacent to each other.

4. The positioning device of claim 1 wherein an axial end face, which faces the mounting disk, of the rotary drive disk forms an axial contact surface for the second leg portions in the guide channels of the mounting disk.

5. The positioning device of claim 1 wherein the rotary body is held rotatably by way of the rotary drive disk on a main body of the positioning device.

6. The positioning device of claim 5 wherein the locking means comprises a locking cage having axially directed stop bars, wherein the locking cage is mounted rotatably relative to the main body and the rotary drive disk.

7. The positioning device of claim 6 wherein the axially directed stop bars project in the axial direction between the positioning body and the mounting disk.

8. The positioning device of claim 6 wherein the locking cage comprises a number of the axially directed stop bars that corresponds to a number of the axially-running receiving grooves of the positioning body.

9. The positioning device of claim 8 wherein the axially directed stop bars project in the axial direction between the positioning body and the mounting disk.

* * * * *